United States Patent [19]

Bremer

[11] Patent Number: 4,464,767
[45] Date of Patent: Aug. 7, 1984

[54] SYSTEM FOR GENERATION OF MULTIPLE POINTED QAM SIGNAL SPACES BY USE OF SYNCHRONOUS QAM TRANSMITTERS

[75] Inventor: Gordon Bremer, Clearwater, Fla.

[73] Assignee: Paradyne Corporation, Largo, Fla.

[21] Appl. No.: 299,663

[22] Filed: Sep. 8, 1981

[51] Int. Cl.³ .............................................. H03D 5/00
[52] U.S. Cl. ....................................... 375/67; 375/39;
375/42; 370/20; 370/118
[58] Field of Search ................. 375/38, 39, 42; 370/8,
370/9, 10, 12, 18, 19, 20, 21, 41, 43, 50, 91, 114,
119, 112, 113, 118; 179/15.55 R

[56] References Cited

U.S. PATENT DOCUMENTS

| | | | |
|---|---|---|---|
| 2,485,886 | 10/1949 | Johnstone et al. | 370/112 |
| 3,261,919 | 7/1966 | Aaron et al. | 370/112 |
| 3,378,771 | 4/1968 | Gerwen et al. | 375/39 |
| 3,821,481 | 6/1974 | Melvin | 370/12 |
| 3,955,141 | 5/1976 | Lyon et al. | 375/39 |

OTHER PUBLICATIONS

Digital Communications: Published by RCA Institutes, 1968, p. 1.7–Linear addition multiplexing.

Primary Examiner—Benedict V. Safourek
Attorney, Agent, or Firm—Kane, Dalsimer, Kane, Sullivan and Kurucz

[57] ABSTRACT

A system for the generation of many-pointed QAM signal spaces by use of multiple, synchronous QAM transmitters is provided. Three individual relatively low BPS data rate transmitters have their outputs connected to different weighting multipliers. The outputs of the weighting multipliers in turn are connected to a summer which produces a composite signal. The input to the individual transmitters comprises a binary data input, the bits of which have been steered to individual ones of low BPS data rate transmitters. The composite output of the summer generates a signal space sufficient for 14,400 BPS transmission utilizing 4800 BPS transmitters.

6 Claims, 5 Drawing Figures (Sequencers not shown for simplicity.)

U.S. Patent  Aug. 7, 1984  Sheet 1 of 2  4,464,767
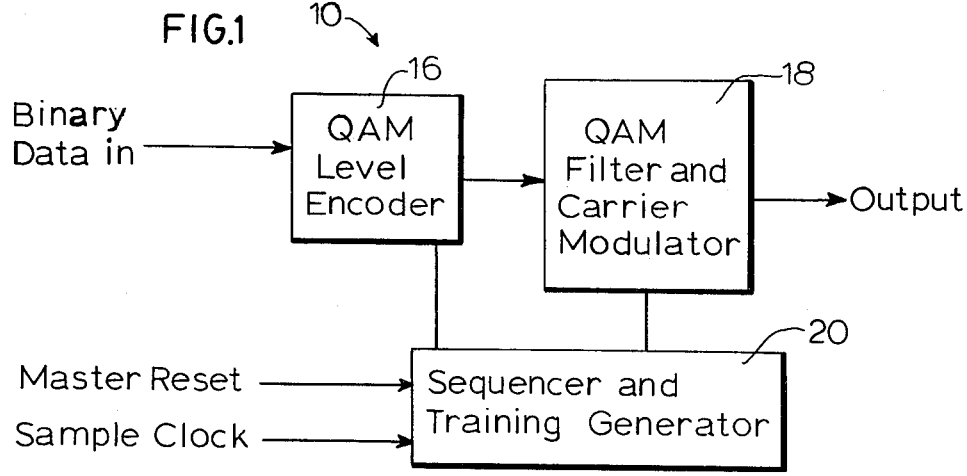
FIG.1
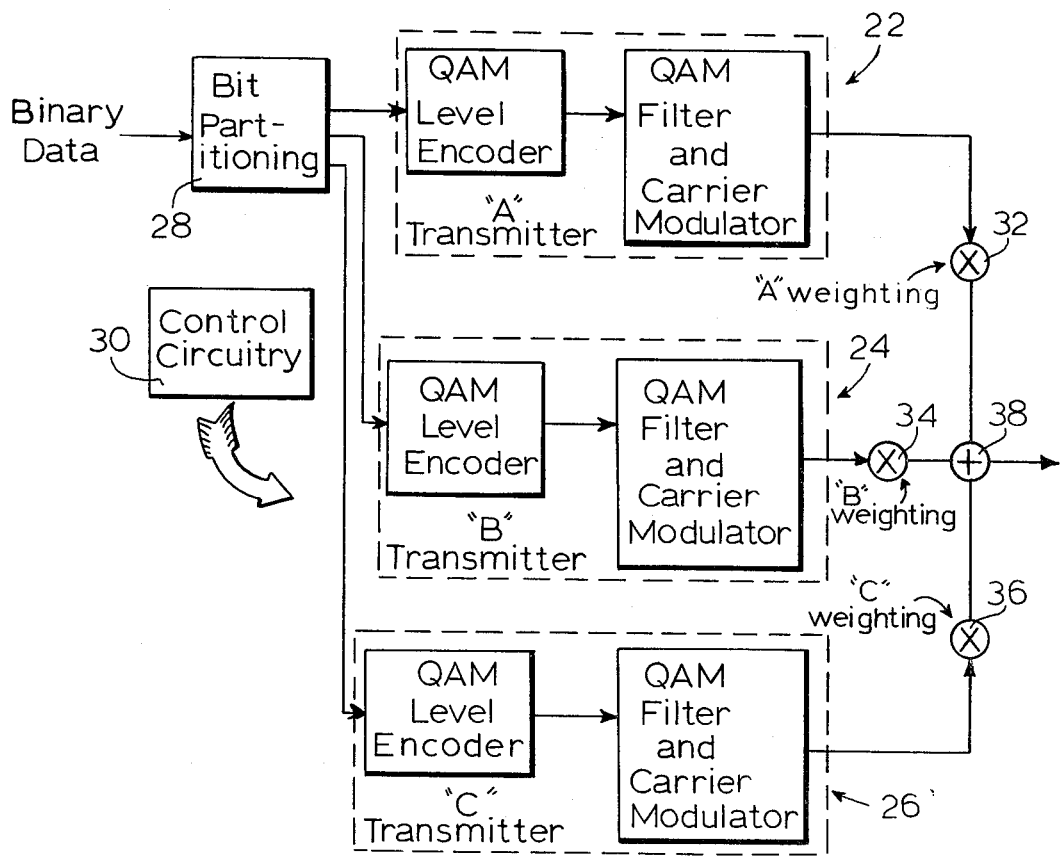
FIG.3  (Sequencers not shown for simplicity.)

SYSTEM FOR GENERATION OF MULTIPLE POINTED QAM SIGNAL SPACES BY USE OF SYNCHRONOUS QAM TRANSMITTERS

BACKGROUND OF THE DISCLOSURE

The present invention relates to QAM data transmitters and in particular to an improved system for synchronously utilizing multiple low speed data transmitters to obtain high speed transmissions.

Heretofore as higher speed data transmission capabilities were required, it was common practice to design specific circuitry for such use. This required an outlay of capital to design such new circuits and also to implement the circuit design.

The principal object of the present invention is to provide an improved system for data transmission wherein existing circuit elements are tied together in such a fashion as to increase their operational rate without requiring any major modification of the basic elements.

SUMMARY OF THE INVENTION

The above and other beneficial objects and advantages are attained in accordance with the present invention by providing an increased (12,000 or 14,400) bits per second (BPS) transmitter formed of connecting three 4800 BPS transmitters in parallel. The inputs to the transmitters are partitioned by steering the six bits per input symbol time to the transmitters, two to each. The outputs of the transmitters are weighted by factors of ¼, ½ and 1 and the weighted outputs are then summed to produce a 64 point space required for 14,400 BPS. For 12,000 BPS 32 preselected points of the 64 point space are utilized.

BRIEF DESCRIPTION OF THE DRAWINGS

In the accompanying drawings:

FIG. 1 is a simplified block diagram of a conventional transmitter capable of transmitting at 4800/7200/9600 BPS;

FIG. 3 is a block diagram of the circuit of the present invention whereby multiple transmitters are connected for data transmission rates above 9600 BPS, although 4800 and 7200 can be produced as well.

DETAILED DESCRIPTION OF THE PREFERRED EMBODIMENT

In FIG. 1, there is shown a simplified block diagram of the principal components of a conventional data transmitter 10, such as the V.29 transmitter available from the Paradyne Corp. of Largo, Florida. Only the essential blocks of the transmitter are shown. These include a QAM level encoder 16, and QAM filter and carrier modulator 18. Binary data is fed to the input of QAM level encoder 16 and a signal appears at the output of carrier modulator 18. The unit is controlled by a sequencer and training generator 20 which receives master reset signals and sample clock pulses. It should be appreciated that other blocks, such as scrambler, gray coder, a timing phase lock loop and the like are not shown for simplicity.

Figure 2:
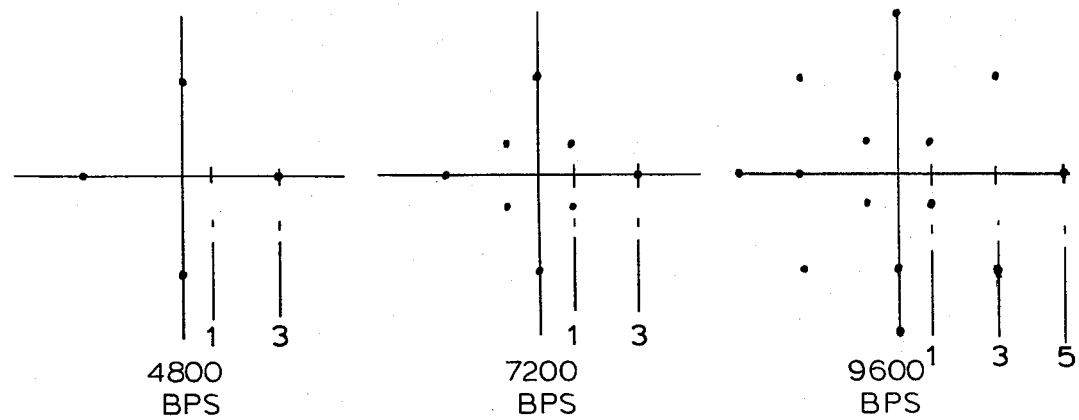
FIG. 2 is a space point representation of the QAM signal spaces for the transmitter of FIG. 1 transmitting at 4800, 7200 and 9600 BPS; as indicated.

The transmitter 10 produces the QAM point signals depicted in FIG. 2 for 4800, 7200 and 9600 BPS, as indicated.

In accordance with the present invention, three transmitters of the type shown in FIG. 1 are run in synchronism with their outputs weighted and summed to produce additional potential signal spaces than would be available with a single transmitter. Thus, as shown in FIG. 3, three identical transmitters 22, 24, 26 are shown. These transmitters are each identical with the prior art transmitter of FIG. 1. The binary data input bit stream is fed to a bit partitioning circuit 28 which divides the input data into three groups, with one group going to each of the transmistters 22, 24, 26. The partitioning is effected through control circuitry 30 which steers the bits sequentially to the proper transmitter 22, 24, 26.

The outputs of the transmitters 22, 24, 26 are then weighted by a predetermined code such as transmitter 22×1; transmitter 24×½; transmitter 26×¼. The output of transmitter 22 is weighted in block 32; the output of transmitter 34 is weighted in block 34 and the output of transmitter 36 is weighted in block 36. For serial digital outputs this can be accomplished by simple bit shifting. The weighted outputs of transmitters 22, 24, 26 are then summed in block 38 to produce a composite output signal. The above configuration permits generation of 32 and 64 point signal spaces for 12,000 and 14,400 BPS utilizing for the transmitters 22, 24, 26 available large scale integration (LSI) transmitter chips.

At 14,400 BPS, six bits are inputted per symbol time. With the bits, designated $B_1$-$B_6$, partitioning may be accomplished by steering:

$B_1, B_2 \times$ TX-A (22)

$B_3, B_4 \times$ TX B (24)

$B_5, B_6 \times$ TC C (26)

Figure 4:
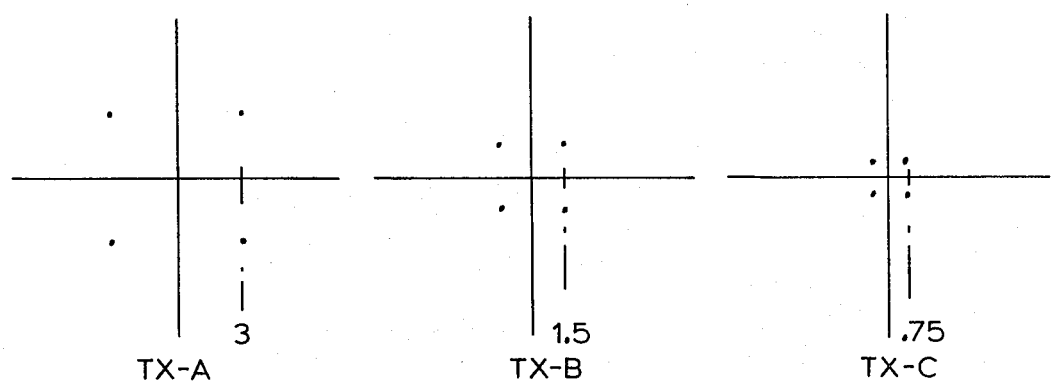
FIG. 4 is a diagram similar to FIG. 2 depicting the individual signal spaces for each of the transmitters making up the composite transmitter of FIG. 3; and, FIG. 5 is a signal space diagram depicting the composite signal space from FIG. 4 for 12,000/14,400 BPS transmitter.
Figure 5:
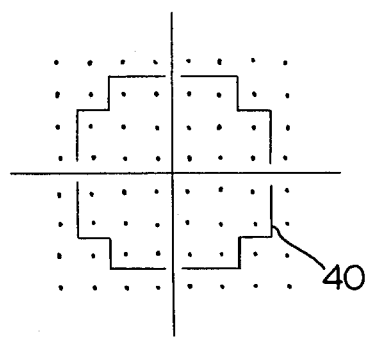

Each of the transmitters 22, 24, 26 is operated at 4800 BPS and, after weighting, produces the signal spaces shown in FIG. 4. After summing these signal spaces create the desired 64 point space of FIG. 5 necessary for 14,400 BPS transmission.

For 12,000 BPS the 32 point set within the solid line border 40 is utilized. The full, unmodified training sequence of each transmitter can be used.

Thus, in accordance with the above, the aforementioned objects are effectively attained.

Having thus described the invention, what is claimed is:

1. A QAM data transmission system for transmitting signals having a high BPS signal constellation comprising:
   a plurality of QAM transmitters adapted to output synchronously signals of a low BPS signal constellation;
   weighing means connected to each of the outputs of said transmitters to weight each of said outputs by a different factor;
   a summer connected to the output of each of said weighing means; and
   a partitioning circuit for receiving a binary data input and steering the data bits to said transmitters;

said different factors being chosen to produce said high BPS signal constellation.

2. The invention in accordance with claim 1 wherein said low BPS transmitters are identical and their transmission rate is 4800 BPS.

3. The invention in accordance with claim 1 wherein said plurality of relatively low BPS rate transmitters comprises three and said weighting means by factors of 1, $\frac{1}{2}$ and $\frac{1}{4}$.

4. The invention in accordance with claim 3 wherein six bits are inputted to said partitioning circuit per symbol time and said six bits are steered two to each of said transmitters.

5. A data transmission system to generating QAM signals having a 64-point QAM constellation comprising:
  first, second and third QAM transmitters each adapted to output QAM signals having a 4-point signal constellation at 4,800 BPS;
  first, second and third multipliers for multiplying the output of said transmitter by factors in the ratio of $\frac{1}{4}:\frac{1}{2}:1$ respectively; and
  a summer for adding the outputs of said multipliers whereby the output of said summer connects of QAM signals having said 64-QAM constellation at 14,400 BPS.

6. The system of claim 5 wherein said 4-point constellation is $2\times 2$ square and wherein said 64-point constellation is an $8\times 8$ square.

* * * * *